United States Patent [19]
Wool et al.

[11] Patent Number: 5,162,392
[45] Date of Patent: Nov. 10, 1992

[54] INJECTION MOLDABLE BIODEGRADABLE STARCH POLYMER COMPOSITE

[75] Inventors: Richard P. Wool; David C. Schiltz, both of Urbana; Dale Steiner, Evanston, all of Ill.

[73] Assignee: Agri-Tech Industries, Inc., Champaign, Ill.

[21] Appl. No.: 612,312

[22] Filed: Nov. 13, 1990

Related U.S. Application Data

[63] Continuation-in-part of Ser. No. 567,366, Aug. 13, 1990, abandoned, which is a continuation-in-part of Ser. No. 354,412, May 19, 1989, abandoned.

[51] Int. Cl.$^5$ .................................................. C08L 3/02
[52] U.S. Cl. ......................................... 523/128; 524/47; 524/52; 524/522; 524/585
[58] Field of Search ................... 523/128; 524/47, 52

[56] References Cited

U.S. PATENT DOCUMENTS 4,337,181  6/1982  Otey et al. ............................ 524/47

*Primary Examiner*—John C. Bleutge
*Assistant Examiner*—Mark Sweet
*Attorney, Agent, or Firm*—Reinhart, Boerner, Van Deuren, Norris & Rieselbach

[57] ABSTRACT

An injection moldable biodegradable plastic formed of corn starch and low-density polyethylene. Ethylene acrylic acid co-polymer can be included in proportions ranging from 0–10%, by weight, and sodium hydroxide can be utilized to neutralize the acidic portions of the ethylene acrylic acid co-polymer. When no ethylene acrylic acid co-polymer is utilized, glycerol is added. To improve injection molding characteristics, the ethylene acrylic acid co-polymer and polyethylene are premixed before the addition of corn starch.

4 Claims, No Drawings

INJECTION MOLDABLE BIODEGRADABLE STARCH POLYMER COMPOSITE

BACKGROUND OF THE INVENTION

This is a continuation in part of U.S. application Ser. No. 07/567,366 filed Aug. 13, 1990, now abandoned which in turn was a continuation in part of U.S. application Ser. No. 07/354,412 to Wool, et al., filed May 19, 1989, and now abandoned.

This invention relates generally to biodegradable plastics and in particular to biodegradable plastics containing starch.

Plastics, despite their many advantages, have one particular drawback that becomes more evident with each passing year, i.e., the long-lasting quality of most plastics in common use makes safe and inexpensive disposal of discarded plastic goods difficult and problematic. This is particularly true of plastic goods, such as food product containers and wrappers, which are discarded after a single use. Although some plastics will, when left exposed to nature, undergo photodegradation or biodegradation, the rate of such degradation is often so slow that, for all practical purposes, the plastics seem to last forever.

To combat these disposal problems, biodegradable plastics containing starch have been developed. Such starch-based biodegradable plastics are shown, for example, in U.S. Pat. No. 4,337,181, U.S. Pat. No. 4,133,784 and U.S. Pat. No. 3,949,145, which issued to Otey, et al., on Jun. 29, 2982, Jan. 9, 1979 and Apr. 6, 1976, respectively. These patents are incorporated by reference herein. Typically, such starch-based biodegradable plastics are produced by combining a starch with a water dispersible plasticizer such as glycerol, or with a water dispersible ethylene acrylic acid (EAA) co-polymer, in the presence of heat. To improve the qualities of the resulting plastic when formed into a blown film, polyethylene (PE) can also be combined with the starch, and ammonia, in either its anhydrous or aqueous form, can be added to neutralize Part or all of the acidic portion of the EAA co-polymer. As set forth in one or more of the previously incorporated Otey patents, acceptable levels of EAA co-polymer are in the range of at least 10% and a maximum of 90% (dry weight), with the preferred amount being in the range of about 30-70%, depending upon the proportion of PE.

Despite the improved qualities of current starch-based biodegradable plastics, some drawbacks still remain. EAA co-polymer is expensive, and thus EAA co-polymer adds substantially to the cost of the resulting plastic. EAA is also a metal adhesive and produces processing problems for injection molding machines. Ammonia-based neutralizers are subject to strict environmental regulation, require special handling during the manufacturing process and can impart a distinctive odor to the Plastic, thereby rendering it unfit for certain applications, such as food product packaging. Furthermore, the use of high fractions of water, required as a "carrier" for the basic ammonia, also gives rise to manufacturing problems in that most of the water has to be removed from the starch-plastic compounds to facilitate subsequent product conversions in conventional plastics processing equipment. Finally, the emphasis in the past has been on biodegradable plastics suitable for the manufacture of blown films, with little substantive work directed to injection molded products.

In view of the foregoing, it is a general object of the present invention to provide a new and improved biodegradable starch-based plastic and method for producing the same.

It is a further object of the present invention to provide a new and improved biodegradable starch-based plastic which can be manufactured with economy.

It is a still further object of the present invention to provide a new and improved biodegradable starch-based plastic which is free of any distinctive odor making the material suitable for food product packaging.

It is a still further object of the present invention to provide a new and improved biodegradable starch-based plastic which is well adapted for injection molding.

SUMMARY OF THE INVENTION

In one form of the invention there is provided a biodegradable injection moldable plastic, consisting essentially of corn starch low density polyethylene ammonium hydroxide and glycerol.

The invention also provides an injection moldable biodegradable plastic consisting essentially of corn starch, low density polyethylene, EAA co-polymer, and glycerol, the ethylene acrylic acid comprising less than 10% of the injection moldable biodegradable plastic.

The invention also provides an improvement in a method for forming an injection moldable biodegradable plastic including corn starch, polyethylene and EAA co-polymer, the improvement comprising the step of neutralizing the acidic portion of the EAA co-polymer through addition of sodium hydroxide.

The invention also provides a biodegradable injection moldable plastic consisting essentially of EAA co-polymer, low density polyethelene, urea and a corn starch selected from the group consisting of low percentage oxidate (such as 0.5% to 3%, preferably 1%) corn starch and acid modified corn starch.

The invention also provides a method of forming an injection moldable biodegradable plastic comprising the steps of premixing a quantity of ethylene acrylic acid co-polymer with a quantity of polyethylene, adding to the premixed ethylene acrylic acid co-polymer and the polyethylene a quantity of starch and sodium hydroxide and adding and mixing with the ethylene acrylic acid co-polymer, the polyethylene, the starch and the sodium hydroxide.

The invention also provides a method of forming an injection moldable biodegradable plastic comprising the steps of premixing a quantity of ethylene acrylic acid co-polymer with a quantity of polyethylene and adding to the premixed polyethylene and the ethylene acrylic acid co-polymer, a quantity of starch.

The invention also provides a method of forming an injection moldable biodegradable plastic comprising the steps of premixing a quantity of corn starch and sodium hydroxide, adding to said premixed corn starch and sodium hydroxide a quantity of EAA co-polymer, and maintaining the temperature of the corn starch, the sodium hydroxide and the EAA co-polymer between approximately 160° F. and 200° F. during mixing.

DESCRIPTION OF THE PREFERRED EMBODIMENT

The present invention provides starch-based biodegradable plastics which are well suited for injection molding. As used herein, plastics which are "well suited for injection molding" are those which provide good fill and packing of the mold cavity, and avoid poor ejection or sticking to the mold, while exhibiting good biodegradability. In accordance with one aspect of the invention, the starch-based plastics of the Present invention display improved injection molding characteristics and retained biodegradability at EAA co-polymer levels below 10% (dry weight) and at starch contents as high as about 80%.

The plastics of the present inventions typically include various types of modified and unmodified corn starches in combination with one or more of low-density polyethylene (LDPE), ethylene acrylic acid (EAA) co-polymer, glycerol and urea. Various additives can be included to improve the injection molding characteristics of the resulting plastic, and either ammonium hydroxide (NH$_4$OH) or sodium hydroxide (NaOH) can be added to neutralize the acidic portion of the EAA co-polymer.

In accordance with one aspect of the invention, EAA co-polymer levels between 0% and 10% (weight) can be utilized to achieve successful injection moldable biodegradable plastics. In those formulations containing no EAA co-polymer, corn starch and polyethylene are typically combined with glycerol as a plasticizer. Ammonium hydroxide can be added as a neutralizer, and a commercially available release agent (such as PEG 3350 from Harwich Company) can be added to improve ejection and avoid sticking to the molds. Preferably, in those formulations utilizing no EAA co-polymer, the corn starch and polyethylene are combined in substantially a one to one ratio, and the glycerol comprises approximately 0.2% by weight of the resulting mixture. The ammonium hydroxide and the release agent preferably comprise 1% and 0.5%, respectively, of the resulting combination.

In those formulations where EAA co-polymer is present in proportions less than 10%, the corn starch and low-density polyethylene are again preferably present in substantially a one to one ratio. EAA co-polymer and glycerol are also present and the quantities of each are such that the EAA co-polymer and the glycerol together comprise approximately 10% (by weight) of the resulting mixture. A monostearate can also be included, and preferably, the proportion of the monostearate is roughly 3.0%.

To avoid the previously cited problems associated with the use of ammonium hydroxide as a neutralizer for the acidic portion of the EAA co-polymer, sodium hydroxide is preferably utilized as a neutralizer. When so utilized, the corn starch and sodium hydroxide are preferably mixed together prior to the addition of the remaining ingredients. In addition, the temperature during mixing is kept relatively low, preferably in the range of 160° to 200° F.

To further improve the thermal stability of the injection moldable plastics described herein, a low percentage, preferably 1%, oxidate corn starch can be used. Alternatively, acid modified corn starch can be utilized to improve thermal stability.

In accordance with another aspect of the present invention, beneficial results can be obtained by premixing the EAA co-polymer with the polyethylene and then adding corn starch as a next step. When sodium hydroxide is used as a neutralizer, a preferred blending sequence is to mix the polyethylene and EAA co-polymer for approximately one minute, thereafter to add the corn starch and sodium hydroxide and continue mixing, and finally to add the selected release agent when mixing is about completed, approximately two and one-half to three and one-half minutes following the initial blending of the polyethylene and EAA co-polymer.

To lower costs and enhance product economy, low levels (less than 10 weight percent) of the relatively expensive ethylene acrylic acid copolymer (EAA) are preferably employed. If sufficient starch-to-polyethylene compatibilization (and physical properties) can be developed at levels of less than 10% EAA, then the expensive EAA, costing approximately $1.75/lb, will not significantly affect the overall cost of the resulting starch-plastic compound.

In the examples that follow, EAA levels of 3%, 6% and (9%, by weight, are demonstrated.

To avoid the use of ammonium hydroxide, the ethylene acrylic acid, in one embodiment of the invention, is not neutralized. The neutralization of the acrylic acid has, in the past, been done to reduce the inherit adhesive characteristics of the copolymer and prevent "sticking" problems in metallic tools of conventional plastic processing equipment. The use of lower levels of acrylic acid allows the use of lubricants to facilitate materials release from equipment molds. Therefore, as an alternative to neutralization, three lubricants have been proposed and tested for release characteristics and their effect on the physical properties of the resulting plastic. The three lubricants are: carbowax (polyethylene glycol), corn oil, and linseed oil.

Since the use of internal lubricants can be affected by molecular size and flow characteristics of the primary polymer, different molecular weights (or inversely, Melt Indices) of polyethylene and the ethylene acrylic acid copolymer have been evaluated in conjunction with the above objectives. Polyethylenes with melt indices of 6 and 70 and ethylene acrylic acid copolymers with melt indices of 3 and 300 have been utilized.

Starch content levels; in the range of 40 and 45 weight percent have been found to achieve acceptable biodegradability of thicker injection molded plastic products.

In investigating the various elements of the injection moldable biodegradable plastic, it has been found that: (a) lubricant choice can greatly affect physical properties development, (b) the melt viscosity of the ethylene acrylic acid copolymer can greatly affect physical properties development, and (c) low levels of ethylene acrylic acid copolymer contribute significantly to physical properties development.

Of the three lubricants, linseed oil has been found to provide the best tensile properties. Linseed oil, while providing good release characteristics for molding, provided ultimate tensile strengths of 20 to 53 percent higher than carbowax and corn oil. This is significant in that it is possible to achieve good product release characteristics and good physical properties without neutralization of the ethylene acrylic acid copolymer. This permits the manufacture of starch-polyethylene biodegradable composites without the requirement, and risk, of ammonium hydroxide.

It is known that the use of ethylene acrylic acid, and the quantity thereof, affects the compatibilization between starch and polyethylene and, hence, the properties of the composite. In the present invention, it has been discovered that the melt index (or molecular weight) of the ethylene acrylic acid can greatly affect the overall composite properties. An unexpected result is that a higher melt index (or lower molecular weight) of ethylene acrylic acid copolymer improves the tensile properties. It has been found that an ethylene acrylic acid copolymer with a melt index of 300 can provide 68% higher tensile strength than a copolymer with a melt index of 3.

In general, the use of polymers and copolymers having lower melt indices (higher molecular weights) provides higher strengths. The benefits realized due to the use of a high melt index ethylene acrylic acid copolymer are unexpected. It is believed that the shorter molecular chains associated with the high melt index ethylene acrylic acid copolymer interact more readily with the surface of the starch granule, and, thereby, achieve a more thorough compatibilization at the starch-polymer interface.

It has also been found that low levels of ethylene acrylic acid provide significantly better properties than compounds that do not contain ethylene acrylic acid. All six experimental control formulations that did not contain ethylene acrylic acid provided the lowest tensile properties.

Based on comparisons in identical formulations, except for ethylene acrylic acid content, the ethylene acrylic acid content which provided the best tensile properties contained 6% EAA, followed by 9% EAA, 3% EAA, and finally, 0% EAA. This suggests that, in starch-EAA-polyethylene composites which are not neutralized, the preferred level of ethylene acrylic acid is more than 3% and less than 9% and approximately 6%. This demonstrates that in non-neutralized compounds which are constrained to a maximum of 10 weight percent ethylene acrylic acid the preferred level of ethylene acrylic acid copolymer is not 10 percent.

As demonstrated above, the present invention provides significant advantages over prior composites in that it permits: (1) the safe manufacture of starch-EAA-polyethylene composites without the need for large amounts of ammonium hydroxide or water, (2) improved strength properties in starch biodegradable composites due to the use of selective lubricants and appropriate molecular weights of acrylic acid, and (3) more economical biodegradable products due to the significant reduction in the required levels of the costly ethylene acrylic acid copolymer.

In the examples 1-6 that follow, initial compounding of all ingredients, unless otherwise indicated, was performed using Banbury produced batch mixtures. The resulting mixtures were next extruded using Killion and Brabender extruders. Following extrusion, the extrudates were pelletized, and the resulting pellets were injected molded in a Newbury injection molding unit. These examples are meant to be illustrative of the inventions and not limiting the scope thereof.

EXAMPLE 1

In a Banbury batch mixer, 107.75 grams of corn starch (common pearl), 107.75 grams of low-density polyethylene (USI-3404), 16 grams of ethylene acrylic acid co-polymer (Dow-3460), 10.75 grams of glycerol, 7.5 grams of monostearate (Hobag 150-s) and 4.6 ml of NH4OH were combined. Mixing continued for a minimum of five minutes with a jacket temperature of 200° Fahrenheit and a weight of 40-95 Psi. The mix was then extruded into strands on a Brabender plasti-corder using a mixing screw operating at 30 to 100 rpm with a mixture temperature of 125° to 150° C. The strands were then pelletized using a Wiley mill and the pellets were injection molded on a Newbury 50-ton injection molding machine. This produced six satisfactory plaques. Some surface blotching occurred and was thought to be a result of starch on the surface.

EXAMPLE 2

The following items were combined in the Banbury batch mixer in the proportions indicated:

| CORN STARCH | 49.1% | 122.9 grams |
| --- | --- | --- |
| LDPE | 49.1% | 122.9 grams |
| NH4OH | 1.0% | 2.5 ml. |
| Release Agent | .5% | 1.2 |
| Glycerol | .2% | .6 |

These items were compounded for five minutes at a weight of 45-95 psi. The resulting compound was then cut into small pieces and then extruded on the Killion extruder at a speed of 140 rpm, with a zone 1 temperature of 150° C. and a zone 2 temperature of 175° C. The resulting pellets were found to be suitable for injection molding carried out thereafter.

EXAMPLE 3

In the Banbury mixer were combined the following items in the proportions indicated:

| CORN STARCH (1 oxidate-330-b) | 100 parts per hundred resin (phr) |
| --- | --- |
| EAA (5901) | 62.5 (phr) |
| LDPE (340b) | 62.5 (phr) |
| Urea (5319) | 25 (phr) |

The resulting mix was extruded on the Brabender extruder and the extrudate was pelletized. The pelletized extrudate was then molded on the Newbury injection molder at 310° F. and 700 psi back pressure. This produced a good plaque showing few if any signs of thermal degradation.

EXAMPLE 4

The following items, in the following proportions, were combined, extruded and injection molded in accordance with the process set forth in Example 3.

| Corn Starch (220-b acid modified) | 100 phr |
| --- | --- |
| EAA (5981) | 62.5 phr |
| LDPE (3404b) | 62.5 phr |
| Urea (5319) | 25 phr |

Although problems were encountered with respect to mold release, the use of modified starch did, however, exhibit improved thermal stability.

EXAMPLE 5

In the Banbury mixer, 140 grams of corn starch (unmodified) were combined with 6 grams of NaOH and mixed for one minute. Thereafter, 140 grams of LDPE (3404b), 35 grams of EAA co-polymer (5981), and 7 grams of peg 3350 as a release agent were added to the premixed corn starch and NaOH. The temperature was kept between 160°-205° F. during compounding. The resulting mix did not discolor, released well and showed little gasing during injection molding.

EXAMPLE 6

24.4 grams of LDPE (3404b) were combined with 5.4 grams of EAA co-polymer (5981) and were mixed for approximately one minute. Thereafter, 24.4 grams of unmodified corn starch and 2.7 grams of NaOH were added to the combined LDPE and EAA co-polymer. Mixing continued for additional one and one-half minutes where upon 0.48 grams of PEG 350, as a release agent, were added.

In the following examples 7-26, various polyethylenes were combined with various ethylene acrylic acids, lubricants and corn starch in various concentrations. The resulting yield strains, yield stresses, ultimate stresses and elogations to break were noted. In each case, compounding took place in a Barabender Plasticorder equiped with a 250 gram mixing bowl and the capability for computerized data collection of temperature and viscocity. Testing took place on Instron standard laboratory tensile testing equipment to measure the stress-strain relationship of the experimental and control samples under tension.

In the following examples, the polyethylenes utilized were obtained from USI Quantum and consisted of NA 270, having a melt index of 70, and NA 336, having a melt index of 6. The ethylene acrylic acids were obtained from Dow Chemical and consisted of EAA 5981, having a melt index of 300, and EAA 1420, having a melt index of 3. The unmodified corn starch comprised cargill 390B pearl. The lubricants consisted of polyethylene glycol (PEG 3350) obtained from Harwick, and 100% common corn oil and common linseed oil.

The formulations and test results for Examples 7 through 26 are shown in the following table.

MATERIALS LIST

| Material | Grade/Description | Supplier |
|---|---|---|
| Polymers: | | |
| polyethylene | NA 270, MI = 70 | USI Quantum |
| polyethylene | NA 336, MI = 6 | USI Quantum |
| Copolymers: | | |
| ethylene acrylic acid | EAA 5981, MI = 300 | DOW Chemical |
| ethylene acrylic acid | EAA 1420, MI = 3 | DOW Chemical |
| Starch: | | |
| Unmodified corn starch | Cargill 390B Pearl | Cargill |
| Lubricants: | | |
| Polyethylene glycol (PEG) | PEG 3350 | Harwick |
| corn oil | 100 corn oil, common | grocery store |
| linseed oil | common | hardware store |

While preferred embodiments of the invention have been shown and described, it will be clear to those skilled in the art that various changes and modifications can be made without departing from the invention in its broader aspects as set forth in the claims provided hereinafter.

What is claimed is:

1. A biodegradable injection moldable plastic consisting essentially of about 40-50% by weight polyethylene, about 40-45% by weight starch, unneutralized ethylene acrylic acid copolymer between about 3-9% by weight and the balance a lubricant.

2. The biodegradable plastic as defined in claim 1 wherein said lubricant is selected from the group consisting of polyethylene glycol, corn oil and linseed oil lubricant.

3. A biodegradable injection molded plastic consisting essentially of about 40-50% polyethylene by weight, about 40-45% by weight starch, unneutralized ethylene acrylic acid copolymer between about 3-9% by weight wherein said ethylene acrylic acid copolymer has a melt index of at least about 300 and the balance being a lubricant in place of a neutralizing agent for said ethylene acrylic acid copolymer.

4. A biodegradable injection molded plastic consisting essentially of about 40-50% polyethylene by weight, about 40-45% by weight starch, unneutralized ethylene acrylic acid copolymer between about 3-9% by weight and the balance being a linseed oil lubricant.

* * * * *

TABLE 1

| | FORMULATIONS | | | | | | | | RESULTS | | | |
|---|---|---|---|---|---|---|---|---|---|---|---|---|
| EX. NUMBER | PE 270 MI = 70 | PE 336 6 | EAA 5981 300 | EAA 1420 3 | STARCH | CARBO WAX | CORN OIL | LINSEED OIL | YIELD STRAIN | YIELD STRESS | ULTIMATE STRESS | ELONGATION TO BREAK |
| 7 | 0 | 100 | 0 | 0 | 0 | 0 | 0 | 0 | 0.504 | 1449 | 1559 | 6.2 |
| 8 | 0 | 45 | 0 | 6 | 45 | 0 | 0 | 4 | 0.245 | 1380 | 1392 | 0.2 |
| 9 | 100 | 0 | 0 | 0 | 0 | 0 | 0 | 0 | 0.964 | 1194 | 1204 | 2.5 |
| 10 | 45 | 0 | 6 | 0 | 45 | 0 | 0 | 4 | 0.198 | 1080 | 1132 | 0.2 |
| 11 | 0 | 45 | 6 | 0 | 45 | 4 | 0 | 0 | 0.099 | 964 | 995 | 0.1 |
| 12 | 50 | 0 | 3 | 0 | 45 | 2 | 0 | 0 | 0.135 | 596 | 975 | 0.2 |
| 13 | 45 | 0 | 6 | 0 | 45 | 4 | 0 | 0 | 0.119 | 233 | 950 | 0.1 |
| 14 | 0 | 47 | 0 | 9 | 40 | 4 | 0 | 0 | 0.121 | 936 | 948 | 0.3 |
| 15 | 44 | 0 | 9 | 0 | 45 | 2 | 0 | 0 | 0.168 | 898 | 936 | 0.2 |
| 16 | 44 | 0 | 9 | 0 | 45 | 2 | 0 | 0 | 0.117 | 895 | 924 | 0.2 |
| 17 | 0 | 45 | 0 | 6 | 45 | 0 | 4 | 0 | 0.123 | 894 | 907 | 0.1 |
| 18 | 42 | 0 | 9 | 0 | 45 | 4 | 0 | 0 | 0.163 | 812 | 845 | 0.2 |
| 19 | 45 | 0 | 6 | 0 | 45 | 0 | 4 | 0 | 0.121 | 798 | 824 | 0.1 |
| 20 | 42 | 0 | 9 | 0 | 45 | 4 | 0 | 0 | 0.161 | 789 | 818 | 0.2 |
| 21 | 48 | 0 | 3 | 0 | 45 | 4 | 0 | 0 | 0.075 | 720 | 729 | 0.1 |
| 22 | 0 | 45 | 0 | 6 | 45 | 4 | 0 | 0 | 0.050 | 550 | 593 | 0.9 |
| 23 | 56 | 0 | 0 | 0 | 40 | 4 | 0 | 0 | 0.422 | 331 | 593 | 0.6 |
| 24 | 0 | 51 | 0 | 0 | 45 | 4 | 0 | 0 | 0.053 | 464 | 557 | 1.4 |
| 25 | 51 | 0 | 0 | 0 | 45 | 4 | 0 | 0 | 0.141 | 103 | 485 | 0.4 |
| 26 | 51 | 0 | 0 | 0 | 45 | 4 | 0 | 0 | 0.398 | 202 | 461 | 0.5 |